United States Patent [19]

Hayman-Chaffey et al.

[11] 4,293,603
[45] Oct. 6, 1981

[54] ACRYLIC SHEET-LACQUER LAMINATES AND ARTICLES OF FURNITURE MADE THEREFROM

[76] Inventors: Charles R. Hayman-Chaffey; Frederick W. Hayman-Chaffey, both of New York, N.Y.

[21] Appl. No.: 110,559

[22] Filed: Jan. 9, 1980

[51] Int. Cl.³ .................. B32B 3/00; B32B 27/00; B32B 27/08; B05B 5/00
[52] U.S. Cl. ........................ 428/86; 260/29.6 RB; 264/129; 264/131; 427/203; 427/258; 427/261; 428/201; 428/203; 428/207; 428/409; 428/500; 428/515
[58] Field of Search ............... 428/106, 151, 201, 86, 428/409, 165, 207, 451, 423.3, 500, 515; 525/327; 260/29.6 RB; 156/231; 264/129, 131; 427/203, 258, 261

[56] References Cited

U.S. PATENT DOCUMENTS

| | | | |
|---|---|---|---|
| 2,563,111 | 8/1951 | Hampson et al. | 428/207 |
| 2,804,399 | 8/1957 | Kelly et al. | 428/332 |
| 2,819,983 | 1/1958 | Salo et al. | 428/451 |
| 2,867,263 | 1/1959 | Bartlett | 156/231 |
| 2,949,383 | 8/1960 | Blake | 525/327 X |
| 3,231,457 | 1/1966 | Meissner | 428/86 |
| 3,457,516 | 7/1969 | Blalock | 328/165 |
| 3,653,950 | 4/1972 | Bonsignore | 428/423.3 |
| 4,082,882 | 4/1978 | Weinstein et al. | 428/246 |
| 4,093,766 | 6/1978 | Scher et al. | 428/165 |
| 4,107,235 | 8/1978 | DeWitt | 260/29.6 RB |
| 4,128,689 | 12/1978 | Heaps et al. | 428/151 |

OTHER PUBLICATIONS

Brochure: "Directional ® Hayman–Chaffey Collection".
Brochure: "Swedlow's Answers to the Security Glazing Problem" Swedlow, Inc., BR877M/E1.
Brochure: "Introducing DuPont Lucite ® SAR . . . A New Acrylic Sheet with Abrasion Resistance Close to Glass", E. I. DuPont de Nemours & Co. E-20235.
Brochure: "Lucite ® SAR Super Abrasion Resistant Sheet", E. I. DuPont de Nemours & Co. E-19278-1, with attachment E20232.
Brochure: "Plexiglass ® Design & Fabrication Data"; PL-229, Rohm & Haas, Jan. 1976.
Modern Surface Coatings, A Textbook of the Chemistry and Technology of Paints, Varnishes & Lacquers, Nylen & Sunderland, Interscience (1965) London, pp. 44-48, 698-701.
McGraw-Hill Encyclopedia of Science & Technology, "Lacquer", p. 424.
Industrial Paint Application, Tatton & Drew, Newnes-Butterworths (1971) London, pp. 250-251, 256-257.

*Primary Examiner*—Thomas J. Herbert, Jr.
*Attorney, Agent, or Firm*—Lane, Aitken, Kice & Kananen

[57] ABSTRACT

A method of making a laminate and articles of furniture made from the laminate are disclosed wherein a transparent acrylic sheet is coated with an acrylic paint coating composition on one side in a predetermined color and decorative pattern. The coated sheet is then coated with an acrylic primer coating composition over the acrylic paint coating. The sheet is adhesively secured to a backing member such as barrel board for fabrication into furniture. Preferably, abrasion-resistant or super abrasion-resistant coated acrylic sheets are used and the side coated with acrylic paint and lacquer is that opposite the abrasion-resistant coated side.

23 Claims, 3 Drawing Figures

ACRYLIC SHEET-LACQUER LAMINATES AND ARTICLES OF FURNITURE MADE THEREFROM

BACKGROUND OF THE INVENTION

This invention relates to a method of making a decorative laminate. More particularly, this invention relates to an article made from a laminate made according to the method of the invention.

Still more particularly, this invention relates to a method of making an article of furniture from the decorative laminate.

Particularly in recent times, the art of designing and manufacturing contemporary furniture has recognized furniture as an art form. Thus, a large selection of furniture and accessory pieces made of acrylic, wood, and metal have evolved from new concepts in furniture design which consider the sculptural as well as the functional role of furniture. By way of example, some designers have utilized effectively acrylic materials, either alone or in conjunction with wood and metal, to form unique and often abstract articles of furniture and accessories.

Acrylic materials, both in a clear form and in solid color form, have been available for quite some time. For example, a "PLEXIGLAS" brand acrylic is a cast thermoplastic acrylic resin sheet produced in a number of formulations to provide specific physical properties required for various types of applications. "PLEXIGLAS" is a registered trademark for such acrylic sheets of the Rohm and Haas Company, Philadelphia, Pa. In addition, "LUCITE" acrylic sheets have long been available from E. I. Dupont de Nemours & Co. Both brands of acrylic sheets have found their way into such decorative furniture designs.

However, the completely effective use of acrylic sheets to form durable and decorative surfacing of furniture has been a problem in the art. It is, of course, desirable that articles made from such acrylic sheets have a durable and decorative surfacing and be scratch resistant. In the past, however, acrylic sheets have generally exhibited poor abrasion-resistance and have been difficult to color or to pattern. However, both DuPont and Swedlow, Inc. produce acrylic sheets having abrasion-resistant or super abrasion-resistant qualities. DuPont produces an abrasion-resistant sheet having improved abrasion-resistant qualities for use in applications where optical quality, cleanability and long term retention of properties is important. Thus, "LUCITE SAR" has been developed by DuPont which has a surface comprising a cross-linked polysilicate resin to provide the acrylic sheet with the combination of properties including abrasion resistance, solvent resistance, and weatherability. In addition, DuPont "LUCITE SAR" brand acrylic sheet can be cleaned using conventional glass cleaners and is resistant to many chemicals which attack other commonly used transparent plastic sheets, including acids, bases, hydrocarbons, esters, and alcohols. The Swedlow abrasion resistant sheet is sold under the "ACRIVUE" trademark and is available from Swedlow, Inc., Garden Grove, Calif. To date, it does not appear that such abrasion-resistant acrylics have been used for furniture or furniture accessories. But, in any event, such materials continue to be difficult to color and pattern.

The use of colorful and durable sheets of materials as a surface for various articles of furniture also exists in the prior art. For example, the use of the well known "FORMICA" brand laminate on counter tops is well known. In addition, other similar materials generally of a solid color, or of a marbled decorative pattern because of the nature of the process to form the laminate, have been used as a decorative outer layer for furniture or accessories.

It has, however, remained a problem in the art and, in particular in the art of contemporary furniture design, to produce a colorful, durable, and decorative surfacing for furniture made from acrylic sheets. This problem is largely founded on an inability to pattern the coloring in a contemporaneous fashion and in a manner which is bright, lustrous, and resistant to fading, while at the same time exhibiting colors which are extraordinarily brilliant and exhibit an apparent depth which is attractive to the eye.

The painting of acrylic sheets with an acrylic lacquer is known in the prior art. Where acrylic paints have been applied to the outer surface of the acrylic sheet, such paints have been hand painted and highly rubbed to provide a brilliant, lustrous finish. Such processing, however, is time consuming and expensive. In addition, such articles have suffered from the problem of chipping, peeling and fading.

The back painting of acrylic sheets with an acrylic lacquer is also known in the prior art. For example, U.S. Pat. No. 4,107,235 to DeWitt discloses an acrylic coating composition for use in back painting impact resistant acrylic sheets for use as signs.

However, none of the approaches to the prior art has been entirely satisfactory in two significant respects. The first relates to the depth, color and brilliance heretofore exhibited by painted acrylic lacquer sheets. The second relates to the ability to form patterns on the acrylic sheet of contemporary design on a selective, non-repetitive basis for use in manufacturing contemporary furniture.

Thus, it is an overall object of this invention to provide a method of making a decorative laminated article suitable for use in making furniture.

It is an additional object of this invention to provide an article of furniture made from a decorative laminated article manufactured according to the invention.

It is another object of this invention to provide a surface material for furniture which is bright, lustrous, and resistant to fading and scratching, while at the same time being relatively inexpensive to manufacture.

It is a further object of this invention to provide a surfacing material particularly suitable for furniture which permits the use of color of extraordinary brilliance and depth, while at the same time providing the colors with protection from chipping, peeling, and fading.

It is a further object of this invention to provide a durable and decorative surfacing material for furniture which may be bonded to a backing sheet with commonly used adhesive without damage to the surface material.

It is a further object of this invention to provide a colorful and durable surfacing material for furniture with a large degree of freedom for the designer in the techniques used to apply the colors and patterns to the surfacing material.

It is still a further overall object of this invention to manufacture a laminate suitable for use in the manufacture of furniture by applying an acrylic paint coating composition in a selected color to at least a portion of a surface of the acrylic composition sheet and applying an acrylic primer coating over at least a portion of the surface of the sheet to which the acrylic paint coating is applied and thereafter laminating the coated surface of the sheet to a backing member to form such a laminate.

These and other objects of the invention will become apparent from a review of the detailed description of the invention which follows.

BRIEF SUMMARY OF THE INVENTION

Directed to achieving the aforementioned objects and overcoming the problems of the prior art, this invention relates to a method of making a decorative laminated article. The method includes the steps of providing as a starting material an acrylic composition sheet which includes a pair of opposed spaced surfaces. Preferably, one of the surfaces is an abrasion-resistant or super abrasion-resistant surface of the type which is commercially available. The surface of the acrylic sheet opposite to the abrasion-resistant surface is coated with an acrylic paint composition in a selected color and in a selected pattern. Thereafter, an acrylic primer coating is applied over at least that portion of the sheet to which the acrylic paint coating has been applied. The coated surface of the sheet to which the acrylic paint coating composition and the primer acrylic coating have been applied is then adhered by an adhesive to a backing member to form a laminate. Where an acrylic sheet is available having an abrasion-resistant coating on both surfaces, it has been found preferable in practicing the invention to remove the abrasion-resistant coating on one surface, such as by sand blasting or sanding, prior to the application of the acrylic paint coating and acrylic primer coating composition.

In practicing the invention, the acrylic paint coating may be repetitively applied in predetermined decorative patterns and colors on successive portions of the coated surface to form a particular colorful design of choice. In addition, both the acrylic paint coating and the acrylic primer coating may be applied with a paint brush, a paint roller, or a paint spray or by the use of silk screen techniques, or air brush techniques which are well known to the art.

A preferred suitable backing material for the laminate is any one of a number of fiber compositions which substantially do not incorporate continuous fiber materials in their composition. Both barrel board materials and chip board materials have been found to be satisfactory.

In manufacturing the article, barrel board material is provided in the approximate shape and form of the furniture article to be manufactured. The base of the surface is preferably laminated first for stress relief. Edging is then applied, followed by the application of the top surfaces, preferably made from the abrasion-resistant sheet. The article is then trimmed, routed and finished.

When the abrasion-resistant sheet is provided with a protective surface such as paper, it has been found advantageous in practicing the invention to utilize templates to scribe and remove only that portion of the paper which represents the design which will ultimately appear on the surface of the sheet. Thereafter, the exposed acrylic sheet is painted and an additional portion of the paper backing is scribed to successively construct a pattern of interest to the designer and user of the article. Certainly, combinations of colors can be used to produce a desired effect such as fadings, transitions, spectral effects, and the like. For example, the color patterns need not have sharp edge definition but rather may change in intensity through a range of a single color, or among several colors.

DETAILED DESCRIPTION OF THE PREFERRED EMBODIMENTS

Figure 1:
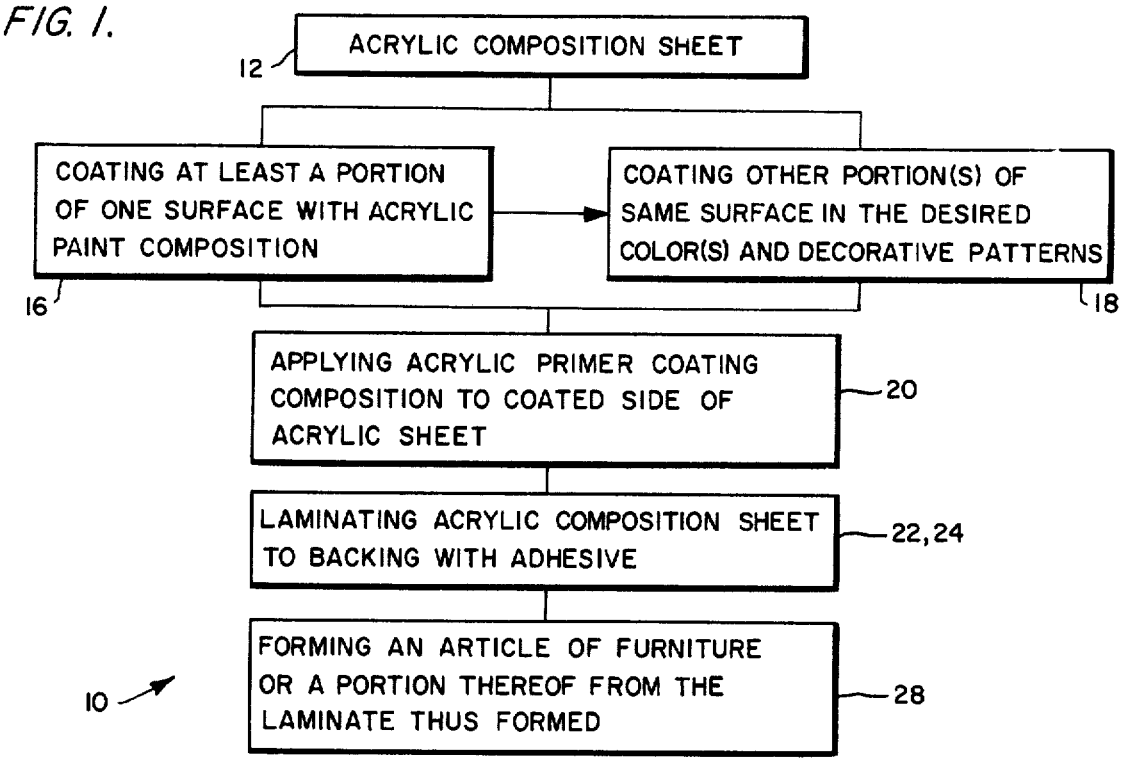
FIG. 1 is a block diagram of the basic steps in making both the decorative laminate and an article of furniture therefrom.

The method of making the decorative laminate and an article of furniture from the decorative laminate according to the invention is shown in block diagram in FIG. 1 and is designated generally by the reference numeral 10.

An acrylic composition sheet 12 is provided as a starting material for the method according to the invention. The sheet 12 is commercially available and preferably includes an abrasion-resistant coating 14 on one surface thereof where the laminate or article will ultimately form a horizontal surface. One suitable acrylic composition sheet for the practice of the invention is available from Swedlow, Inc. under the brand name "ACRIVUE". The acrylic composition sheet available from Swedlow, Inc. has the advantage of having an abrasion resistant coating only on one side of the acrylic sheet and a temporary protective covering, such as paper, over both the abrasion-resistant coating surface and the surface opposite to the abrasion-resistant coating surface.

Other suitable acrylic composition sheets are available from DuPont under the designations "LUCITE AR" and "LUCITE SAR", of which the latter is preferred. The former was introduced as an abrasion acrylic sheet in 1970 and has the advantage of being about 15 times more resistant to abrasion than conventional acrylic sheet material. More recently, DuPont has introduced "LUCITE SAR" brand super abrasion-resistant acrylic sheets which are 75 times more abrasion resistant than conventional acrylic composition sheets.

Any of the foregoing abrasion-resistant acrylic sheets are particularly suitable for use in making the laminate and furniture according to the invention and in particular for making horizontal surfaces thereof. The abrasion resistance as well as the resistance to chemicals including alcohol make such materials particularly suitable for table tops and the like. It is understood that the DuPont "LUCITE SAR" brand acrylic resin material is a clear acrylic sheet offering the advantages, among others, of such a sheet being provided with a thin coating of a cross-linked polysilicate resins to provide chemical resistance and abrasion resistance close to glass. The particular composition and method of making the acrylic sheets, the abrasion-resistant acrylic sheets, or the super abrasion-resistant acrylic sheets do not form a part of this invention.

The acrylic sheet 12, which is preferably clear or transparent, is coated on one surface or at least a portion of one surface, as designated by the reference numeral 16, with an acrylic paint composition which is preferably colored. When only a single color is desired, the entire surface is painted with the acrylic paint composition as described. However, where only a portion of the surface is to be colored or the surface is to be multi-colored, successive coating steps are performed as will be described, in order to provide the desired end product in terms of color and design. The repetitive steps of coating other portions in the desired colors and decorative patterns are designated generally by the reference numeral 18.

The coating step may be performed in any of the conventional ways of applying acrylic paints, such as by applying the acrylic paint coating with a paint brush, a roller, or by a spray. In addition, the acrylic paint coating may be applied by the use of silk screen techniques or by air brush techniques, or any other suitable techniques for applying acrylic lacquer coating.

The use of automotive acrylic lacquers has been found to be particularly advantageous and one source of such lacquers is Limbacher, although other acrylic lacquer paint compositions may also be used. Such acrylic paint compositions or automotive acrylic lacquers are available commercially. The automotive acrylic paint lacquers have been found to be particularly advantageous because of their ability to resist fading, their brightness of color, and the apparent depth of color exhibited by the laminate when such automotive lacquers are used. The composition and the method of mixing acrylic automotive paint lacquers or paint lacquers are not within the scope of this invention.

Figure 2:
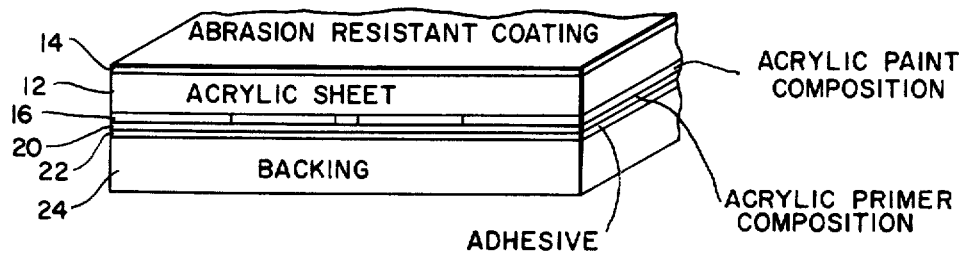
FIG. 2 is a side cross sectional view of the laminate showing the various layers in an emphasized form.
Figure 3:
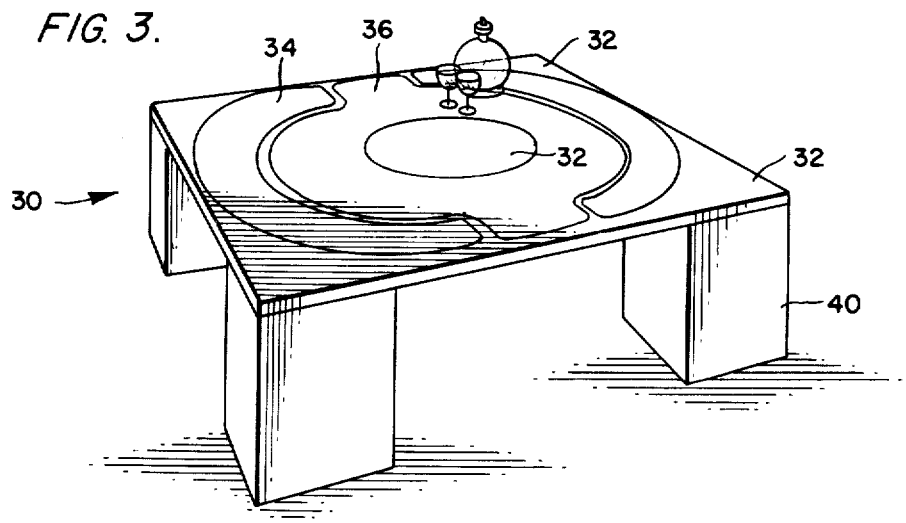
FIG. 3 is a representative example of an article of furniture, namely a cocktail table, having a decorative top surface made from the decorative laminate according to the invention using an abrasion-resistant acrylic and other surfaces thereof made from laminates according to the invention.

In FIG. 3, a cocktail table designated generally by the reference numeral 30 has been made utilizing the laminates prepared according to the invention. On the surface 32 of the table, a decorative pattern is shown wherein the surface 32 is the color of charcoal, whereas the portion of the pattern designated by the reference numeral 34 is the color of oxblood and the portion designated by the reference numeral 36 is silver. When applying the colors, a template or mask is provided to block out the portions designated by the reference numerals 34 and 36 and the remainder of the sheet designated by the reference numeral 32 is coated with the desired charcoal-colored acrylic paint. Thereafter, the template or mask portion 34 is removed and the surface of the acrylic painted with oxblood-colored acrylic paint to produce the oxblood-colored portion and pattern 34 demonstrated in FIG. 3. Finally, the template or mask defining the pattern of the portion of the surface designated by the reference numeral 36 is removed from the rear surface of the laminate and the silver paint applied to the portion 36 to produce the overall effect. Thereafter, the laminate (after further processing described in connection with FIGS. 1 and 2) is used as the top of the cocktail table 30 and exhibits the pattern produced by the repetitive painting of the surface in the desired colors and decorative patterns sought by the designer. The article 30 shown in FIG. 3 is merely illustrative of a myriad of patterns and designs which can be produced on the sheet of acrylic according to the invention.

Because the abrasion-resistant sheet from Swedlow is only coated on a single side, the opposite side from the abrasion-resistant coating is coated with the acrylic paint according to the invention. Where the abrasion-resistant sheet is coated on both sides with the abrasion-resistant or super abrasion-resistant coating, such as that provided by DuPont, it has been found desirable to remove the abrasion-resistant or super abrasion-resistant surface from one side prior to painting. This surface layer, which is quite thin, can be removed by delicate sand blasting techniques known to the art, or by sandpapering, by way of example. Thus, in this respect, the Swedlow sheets are advantageous since they do not require the additional step of removing an abrasion-resistant layer prior to painting. However, the abrasion-resistant sheet need not always be altered and the paint can be applied to the abrasion-resistant surface in the alternative, although this form of practicing the invention is not presently preferred.

After a surface has been coated in the desired color and decorative patterns, an acrylic primer back-up coating is applied over the entire surface. This is contrary to the established techniques of utilizing primers next to the surface to be painted and is a major distinction over painted acrylic sheets or laminates previously known to the prior art. A suitable primer back-up coating 20 is an automotive lacquer primer available from Limbacher under the designation "PLATINUM 4200". Other primer coats and particularly other acrylic primer coatings, especially automotive lacquer primers, may also be used.

While the chemistry of the interaction between acrylic lacquer and the acrylic sheet with respect to the primer coating, if any, is not completely understood, it is believed that the acrylic lacquer composition is preferable because solvents in the acrylic lacquer actually dissolve the outer surface of the sheet microscopically to embed the pigment in the lacquer into the acrylic sheet substrate thus permanently bonding the two elements together. The effect of the primer back-up coating in the unexpected position outside of the paint layer is believed to enhance the depth and lustrousness and brilliance of the color through the sheet and at the same time to protect the acrylic color coating from dulling or from removal during the step of applying an adhesive 22 to secure the laminate to a backing 24.

The backing 24 is preferably made from a material such as barrel board or chip board. Preferably, the backing material does not have continuous fibers so that the irregularity of absorption is avoided. In this respect, plywood may be used but is less satisfactory than either barrel board or chip board. A suitable source of barrel board is the 3M Company under the designation "MD-44". The coated acrylic sheet is adhesively secured to the backing board to provide the laminate desired which may then be formed into an article of furniture according to the step designated generally by the reference numeral 28.

The techniques and processes for producing an article of furniture quite obviously vary with the particular article produced. Thus, the method of making the article shown in FIG. 3 need only be described in general terms. Assuming that a surface laminate having the desired pattern and shape to produce the table top has been provided for the article 30, it has been found advantageous to laminate the base of the barrel board surface for the table with an acrylic sheet which need not be decorated, such as with a Formica brand laminate for stress relief. Thereafter, the edging from a sprayed acrylic sheet according to the invention in a solid color is applied. Then, the top is applied having the abrasion resistant sheet surface on the outside.

Thereafter, the article is trimmed, routed, and finished according to the known processes in the furniture making art. The legs 40 of the table 30 are made in a similar fashion. Neither the sides nor the bottom of the table top of the table 30 need to be made from an abrasion-resistant coating.

Moreover, since the surfaces of the legs, like the sides and bottom of the table top, are not expected to receive objects, those surfaces may be made from an acrylic sheet according to the invention which does not have an abrasion-resistant surface. Examples of materials suitable for use for such surfaces include "PLEXIGLAS" acrylic sheets available from Rohm and Haas Company and "LUCITE" acrylic sheets available from DuPont. The methods of securing the legs to the table are many and well known to the furniture making art.

While a cocktail table has been described, the invention may be used with other examples of contemporary furnishings, such as dining tables, consoles, wall units, cabinets and the like.

The transparent acrylic sheet which has been treated on one side with an abrasion-resistant coating of, for example, cross-linked polysilicate resin has proven particularly suitable for the practice of the invention. Such abrasion-resistant acrylic sheets combine the physical characteristics of cast acrylic sheets with an abrasion-resistant cleanable surface. The abrasion-resistant surface can be cleaned using conventional glass cleaner and exhibits excellent resistance to moisture and weathering. Such a durable outer layer makes the laminate of the present invention particularly suitable for commercial and outdoor applications as well as for furniture. Thus, although the decorative laminate has a particular advantage in manufacturing contemporary furniture, as has been emphasized in this description, it is clear that the laminate can be used in many other applications. For example, the laminate can be used as a decorative surface on walls and ceilings especially in commercial applications such as office buildings, apartment buildings, and restaurants.

In addition, the decorative laminate of the invention has numerous advantages over plain acrylic sheets which might be used in similar applications. Transparent acrylic sheets have the disadvantage that they must be held in place by screws or other unsightly hardware. If they were to be glued, the glue would be visible through the transparent sheet. If opaque acrylic sheets were to be used, they would be susceptible to scratching and wear and tear. Furthermore, the color available in such opaque sheets are limited and lack the brilliance of the acrylic lacquers of the present invention. Such plain acrylic sheets are also susceptible to attack from chemicals such as alcohol. In addition, solid color acrylic sheets are often expensive and sometimes substantially more expensive than Formica brand acrylic sheets.

The invention may be embodied in other specific forms without departing from its spirit or essential characteristics. The present embodiments are, therefore, to be considered as illustrative but not restrictive, the scope of the invention being indicated by the claims rather than by the foregoing description and all changes which come within the meaning and range of the equivalents of the claims are therefore intended to be embraced therein.

What is claimed is:

1. A method of making a decoarative laminate comprising the steps of:

(a) providing as a starting material an acrylic composition sheet which includes a pair of opposed spaced surfaces;

(b) applying an acrylic paint coating composition in a selected color to at least a portion of one surface of the acrylic composition sheet;

(c) applying an acrylic primer coating composition over at least that portion of the surface of the sheet to which the acrylic paint coating has been applied; and (d) adhesively bonding the surface of said sheet to which the acrylic paint coating composition and the primer acrylic coating have been applied to a backing member, whereby the uncoated surface of the acrylic sheet layer forms the outer layer of the laminated article.

2. The method as set forth in claim 1 wherein said backing material is substantially a non-continuous fiber material.

3. The method as set forth in claim 1 wherein said acrylic paint coating composition is an automotive acrylic lacquer and said acrylic primer coating composition is an automotive acrylic primer.

4. An article of furniture which includes a laminate made according to the process of claim 1.

5. The method as set forth in claim 1, wherein said acrylic composition sheet is transparent.

6. The method of making a decorative laminated article as set forth in claims 1 or 5 wherein said laminated article is an article of furniture.

7. The method of making a decorative laminated article as set forth in claim 1 or claim 5 wherein the step of applying the acrylic paint coating is further defined in that the coating is repetitively applied in a predetermined decorative pattern on successive portions of the said one surface of the acrylic composition sheet.

8. The method of making a decorative laminated article as set forth in claim 7 wherein the steps of applying the acrylic paint coating and the acrylic primer coating are performed by any one of the steps of: applying with a paint brush, roller, or spray; applying by the use of silk screen techniques; and applying by air brush techniques.

9. The method of making a decorative laminated article as set forth in claim 7 wherein said laminated article is an article of furniture.

10. The method of making a decorative laminated article as set forth in claim 7 wherein the surface of the acrylic composition sheet provided as a starting material opposite to which the acrylic paint coating and the acrylic primer coating are applied has an abrasion-resistant surface coating or a super abrasion-resistant surface coating, which coating forms the outer surface of the laminated article.

11. An article of furniture which includes a laminate made according to the process of claim 10.

12. The method of making a decorative laminated article as set forth in claims 1 or 5 wherein the steps of applying the acrylic paint coating and the acrylic primer coating are performed by any one of the steps of: applying with a paint brush, roller, or spray; applying by the use of silk screen techniques; and applying by air brush techniques.

13. The method of making a decorative laminated article as set forth in claim 12 wherein said laminated article is an article of furniture.

14. The method of making a decorative laminated article as set forth in claim 12 wherein the surface of the acrylic composition sheet provided as a starting material opposite to which the acrylic paint coating and the acrylic primer coating are applied has an abrasion-resistant surface coating or a super abrasion-resistant surface coating, which coating forms the outer surface of the laminated article.

15. An article of furniture which includes a laminate made according to the process of claim 14.

16. The method of making a decorative laminated article as set forth in claims 1 or 5 wherein the surface of the acrylic composition sheet provided as a starting material opposite to which the acrylic paint coating and the acrylic primer coating are applied has an abrasion-resistant surface coating or a super abrasion-resistant surface coating, which surface coating forms the outer surface of the laminated article.

17. An article of furniture which includes a laminate made according to the process of claim 16.

18. The method of making a decorative laminated article as set forth in claim 16 wherein said laminated article is an article of furniture.

19. An article of furniture comprising at least one member thereof which includes:
   an acrylic composition sheet which includes a pair of opposed spaced surfaces;
   a thin layer of acrylic paint coating composition in a selected color on at least a portion of one surface of the acrylic composition sheet;
   a thin layer of acrylic primer coating composition over at least that portion of the one surface of the acrylic composition sheet to which the acrylic paint coating has been applied; and
   a backing member adhesively secured to said acrylic composition sheet on the same side thereof to which the acrylic paint coating composition and the acrylic primer coating composition has been applied.

20. The article as set forth in claim 19 wherein the acrylic composition sheet is transparent prior to application of the acrylic paint coating composition.

21. The article as set forth in claim 19 wherein the acrylic paint coating composition comprises various colors in a decorative pattern across the said one surface of said sheet.

22. The article as set forth in claim 19 or 21 wherein the other surface of said acrylic sheet has abrasion-resistant surface coating.

23. The article as set forth in claim 19 or 21 wherein the other surface of said acrylic sheet has a super abrasion-resistant surface coating.

* * * * *